Figure 1:
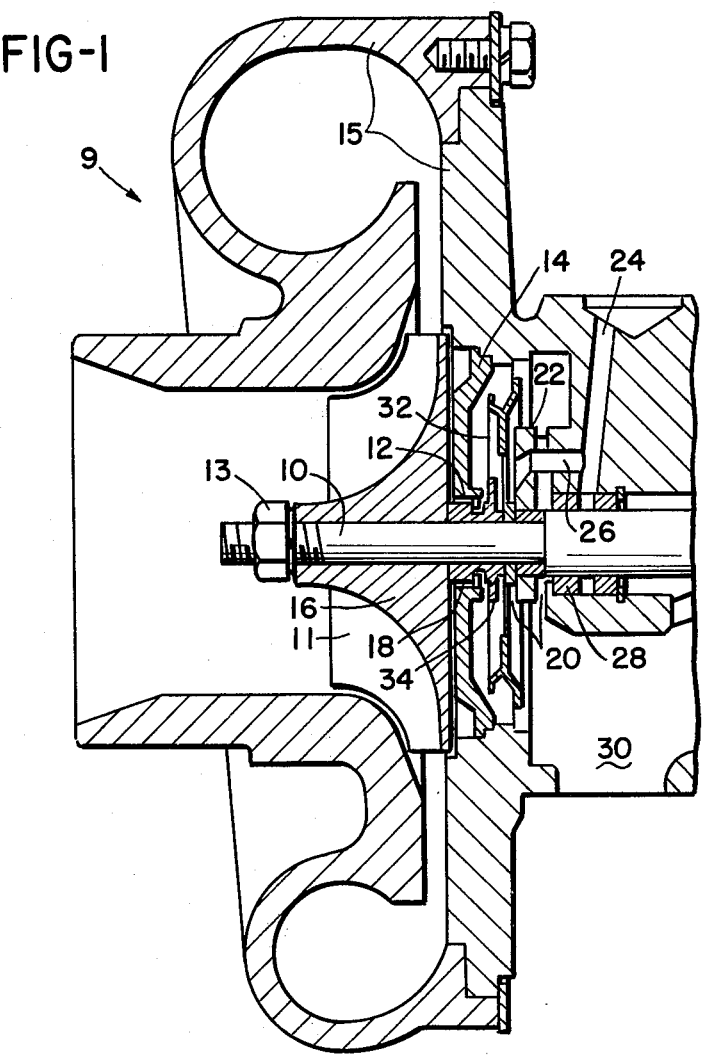

United States Patent [19]

Atkin

[11] 4,265,456
[45] May 5, 1981

[54] SEALING ASSEMBLY

[75] Inventor: Howard S. Atkin, Leeds, England

[73] Assignee: Holset Engineering Company Limited, Huddersfield, England

[21] Appl. No.: 46,410

[22] Filed: Jun. 7, 1979

[51] Int. Cl.$^3$ ............................................. F16J 15/34
[52] U.S. Cl. ...................................... 277/95; 277/134; 415/114
[58] Field of Search .................... 277/3, 27, 53, 54, 83, 277/95, 133, 173, 174, 134, 177, 190, 191, 216, 188 R, 188 A, DIG. 6; 415/110, 111, 113

[56] References Cited

U.S. PATENT DOCUMENTS

| | | |
|---|---|---|
| 2,087,313 | 7/1937 | Bigelow et al. .......................... 277/27 |
| 2,759,778 | 8/1956 | Anderson .......................... 277/220 X |
| 3,565,497 | 2/1971 | Miller .................................. 277/53 X |
| 3,743,303 | 7/1973 | Pope ...................................... 277/27 |
| 3,917,288 | 11/1975 | Huber et al. ............................ 277/59 |
| 4,153,258 | 5/1979 | Huber et al. ...................... 277/133 X |
| 4,157,834 | 6/1979 | Burdette ............................ 277/133 X |
| 4,169,605 | 10/1979 | Mishimoto et al. ............. 277/188 A |
| 4,196,910 | 4/1980 | Aizu .................................. 415/111 X |

Primary Examiner—Robert S. Ward, Jr.
Attorney, Agent, or Firm—Gary M. Gron; Robert T. Ruff

[57] ABSTRACT

The disclosure illustrates a sealing assembly for two relatively rotatable members, such as a compressor housing and a shaft for a compressor wheel. The first has an internal cylindrical surface and the second has an external cylindrical surface with an annular groove therein. The second member is disposed and rotatable within the first member and a sealing ring is disposed in the annular groove. The sealing ring is a continuous member having no circumferential gaps and made from PTFE which has sufficient elasticity to enable the radially inner diameter of the ring to be temporarily increased. It is also capable of working at the temperatures to which the assembly is subjected in use and has a low coefficient of friction.

1 Claim, 2 Drawing Figures

SEALING ASSEMBLY

The present invention relates to a sealing assembly comprising two relatively rotatable members and a sealing ring located between the two members.

Various forms of sealing assemblies are used for sealing two relatively rotatable members where one member is rotatable within the other. The outer of the two members has an internal cylindrical surface and the inner of the two members has an outer cylindrical surface opposing the cylindrical surface of the outer member. An annular groove is provided in the outer cylindrical surface of the inner member. A sealing ring is disposed in the annular groove and engages the cylindrical surface of the outer member. In all such instances where the two members are rotatable relative to one another at very high speeds it has been customary to use cast iron or similar metal rings, such rings having a gap or split in them to allow the ring to be fitted into the annular groove during assembly. This results in the disadvantage that leakage may occur through the gap.

Existing sealing rings in such applications are normally metallic and thus suffer from the following disadvantages:
1. Expense,
2. They allow leakage of oil etc., via the gap which must necessarily be included in the ring in order to allow assembly,
3. They are hard and thus cause wear on many materials such as aluminum or plastic housing members thereby forcing the manufacturer to use a more expensive cast-iron housing member.

According to the present invention the above problems are solved by a sealing assembly comprising two relatively rotatable members, the first of which has an internal cylindrical surface and the second of which has an external cylindrical surface having an annular groove therein, the second member being disposed and rotatable within the first member, a sealing ring disposed in said annular groove in said second member and being an interference fit with the internal cylindrical surface of the first member, said sealing ring being continuous and being made from a plastics material such as PTFE which has sufficient elasticity to enable the inner diameter of the ring to be temporarily increased, which is capable of working at the temperatures to which the assembly is subject and which has a low coefficient of friction.

One especially preferred use of the present invention is in forming a seal between the shaft and the housing in a turbocharger especially at the compressor end of the turbocharger.

For avoidance of doubt, the expression "continuous" as used throughout this specification is intended to mean that the sealing ring does not include the "gap" or "split" which is a complete break in the ring usually provided to allow the ring to be placed in position in the groove.

Figure 2:
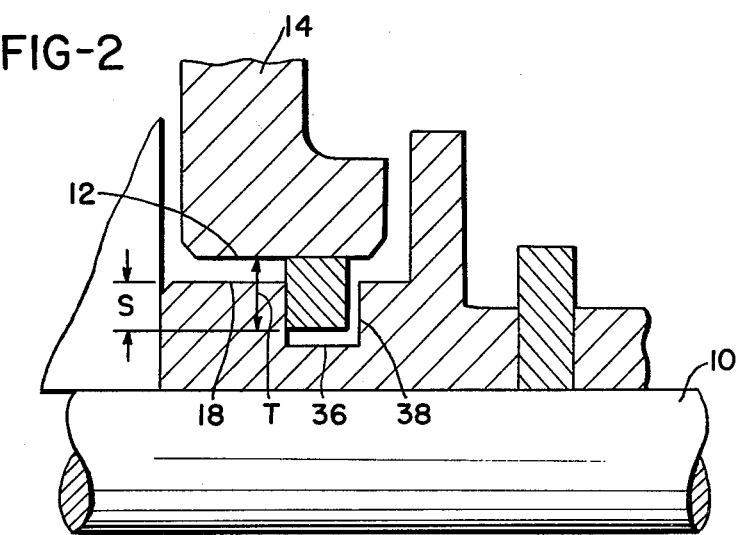

The present invention will now be further described by way of example with reference to the accompanying drawings in which:

FIG. 1 is a fragmentary cross sectional view of a turbocharger compressor along with a sealing assembly embodying the present invention and FIG. 2 is an enlarged detail view of the seal area of FIG. 1.

Referring now to the drawing, there is shown a portion of the compressor end of a turbocharger 9. A rotatable shaft 10 on which the compressor wheel 11 is mounted by a nut 13 passes through a cylindrical aperture 12 in a backplate 14 of the compressor. The compressor wheel 11 and back plate 14 are positioned within a compressor housing 15.

A spacer sleeve 16 is telescoped over shaft 10 next to compressor wheel 11 so that peripheral surface 18 forms a clearance with respect to aperture 12. Spacer sleeve 16 is also next to a pair of spaced thrust rings 20 on shaft 10, positioned on opposite faces of a stationary thrust plate 22 mounted on housing 15. Passages 24, 26 direct lubricating fluid from a suitable pressurizing source (not shown) to the faces of thrust plate 22 for lubrication. A floating sleeve bearing 28, adjacent thrust plate 22, receives lubricating fluid from passage 24 to journal shaft 10.

The lubricating fluid supplied to thrust plate 22 and bearing 28 passes to chamber 30 in housing 15 either in liquid form or a mist, where it falls by gravity to a suitable drain. If the turbocharger 9 is used in conjunction with an internal combustion engine, there are times (e.g. engine acceleration) when the pressure existing on the compressor side of backplate 14 can be subatmospheric. This results in a positive pressure forcing fluid toward the compressor wheel 11. Loss of fluid when this occurs is resisted by a fixed baffle assembly 32 and flinger 34 on sleeve 16.

However, to effectively resist leakage an annular groove 36 is located in the peripheral surface of the spacer sleeve 16 and a sealing ring 38 is located in the annular groove. The sealing ring is continuous i.e. it does not include the conventional split or gap and has been placed in position into the annular groove 36 by stretching the ring to force it over the normal diameter of the spacer sleeve and allowing it to relax into position within the annular groove.

The sealing ring 38 is made from a plastics material such as polytetrafluoroethylene (PTFE) which has a sufficient degree of elasticity to enable it to be placed in position in the annular groove, which is capable of working at the temperatures to which the assembly is subjected and which has a low coefficient of friction.

Other materials from which the sealing ring may be made include high temperature resistance nylon and rubber-like materials.

In the foregoing arrangement, in accordance with the present invention, the area of contact between the sealing ring 38 and the side wall of the groove (identified by S) is greater than in conventional sealing assemblies, because the thickness T of the sealing ring 38 is greater than in conventional sealing assemblies. This results in a longer leakage flow path to make it more difficult for fluid to pass to the compressor wheel.

By utilizing the sealing assembly of the present invention the following advantages may be achieved:
1. A reduction in cost since, for example, a sealing ring made from PTFE would cost approximately half the price of a cast-iron sealing ring;
2. Since the ring of the present invention has no gap it will not be subject to the leakage which can take place via such a gap or split;
3. The rings of the present invention will, in general, result in less wear since, for example, polytetrafluoroethylene is a fairly soft material and would not cause as much wear of aluminum or plastic housing members as would a cast-iron sealing ring. It is therefore possible to use housing members made of cheaper materials than cast-iron;

4. Many of the materials which are utilizable for the sealing ring, e.g. PTFE, are wear resistant materials and, therefore the ring should not itself be subject to a great degree of wear;

5. The sealing ring may be made thicker (i.e. its dimension in a radial direction may be greater) and the area of contact between the ring and the side wall of the groove in which it is located may therefore be greater thus resulting in a greater degree of sealing. It is normally not possible to increase the thickness of existing sealing rings since this would result in problems of assembly;

6. By making the sealing ring an interference fit with the cylindrical surface it is possible to ensure a better seal therewith.

Although the sealing ring used in the sealing assembly of this invention may be of rectangular cross sectional shape it may also have a chamfered side wall as described in our copending U.S. application Ser. No. 046,409.

The sealing assembly of the present invention is applicable to all constructions comprising two relatively rotatable members.

While a preferred embodiment of the present invention has been described, it should be apparent that it may be practiced in other than the illustrated form without departing from its spirit and scope.

Having thus described the invention, what is claimed and novel and desired to be secured by Letters Patent of the United States is:

1. A turbocharger assembly comprising:
a compressor housing having an internal cylindrical surface,
a shaft for a compressor wheel, said shaft having an externally facing cylindrical surface having an annular groove therein, the shaft being disposed and rotatable within the compressor housing, and
a sealing ring disposed in said annular groove in said second member and having an interference fit with the internal cylindrical surface of said compressor housing, said sealing ring being continuous and formed from polytetrafluoroethylene having sufficient elasticity to enable the inner diameter of the ring to be temporarily expanded to be positioned within said groove.

* * * * *